(12) United States Patent
Horai et al.

(10) Patent No.: US 6,607,824 B2
(45) Date of Patent: Aug. 19, 2003

(54) MAGNETIC READ/WRITE SYSTEM AND MAGNETIC RECORDING MEDIUM

(75) Inventors: Takashi Horai, Tokyo (JP); Hideki Sasaki, Tokyo (JP); Hiroyuki Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/075,459

(22) Filed: Feb. 15, 2002

(65) Prior Publication Data
US 2002/0154552 A1 Oct. 24, 2002

(30) Foreign Application Priority Data
Feb. 15, 2001 (JP) ........................................ 2001-039070

(51) Int. Cl.[7] ................................................. G11B 5/71
(52) U.S. Cl. ............................... 428/336; 428/694 BP; 428/694 BS
(58) Field of Search ........................... 428/336, 694 BP, 428/694 BS

(56) References Cited

U.S. PATENT DOCUMENTS 5,637,390 A * 6/1997 Isobe et al. ................. 428/323
5,744,216 A * 4/1998 Goto et al. ................. 428/141

FOREIGN PATENT DOCUMENTS

| JP | 39-28367 | 12/1964 |
|----|----------|---------|
| JP | 41-18065 | 10/1966 |
| JP | 47-12950 | 4/1972 |
| JP | 50-22603 | 3/1975 |
| JP | 50-153905 | 12/1975 |
| JP | 53-149302 | 12/1978 |
| JP | 55-139637 | 10/1980 |
| JP | 58-218038 | 12/1983 |
| JP | 60-205827 | 10/1985 |
| JP | 61-294637 | 12/1986 |
| JP | 62-125529 | 6/1987 |
| JP | 2559259 | 12/1996 |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

A novel magnetic read/write system, in which a fixed MR head serves to read magnetically recorded data from a magnetic recording medium as it operates at a relative speed of 2.0 to 5.0 m/s with respect to the magnetic recording medium comprising a non-magnetic support and a magnetic layer. A fatty acid ester represented by general formula (I):

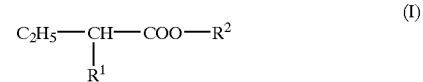

where $R^1$ is a hydrocarbon having 4 or less carbons, and $R^2$ is a straight chain hydrocarbon having 12 or more carbons, exists between a read element of the MR head and the magnetic layer. This magnetic read/write system exhibits improved adherence to heads, running durability, and wear resistance of the tape in low temperature conditions as well as at room temperature.

3 Claims, No Drawings

MAGNETIC READ/WRITE SYSTEM AND MAGNETIC RECORDING MEDIUM

BACKGROUND OF THE INVENTION

1. Field of the Invention

The present invention relates to a magnetic read/write system uses a fixed MR head to read magnetically recorded data from a magnetic recording medium, and to such a magnetic recording medium. More particularly, the present invention relates to a magnetic read/write system that employs a fixed MR head to read magnetically recorded data from a magnetic recording medium, with improved running durability, adherence to a head, and wear resistance and to such a magnetic recording medium

2. Description of the Related Art

As the recording density of magnetic recording media increases, friction between a magnetic layer and components of a reading device during running has posed a significant problem and there is an increasing need to improve running durability, adherence to a head, and wear resistance of such recording media.

To meet such needs, techniques have been developed where a fatty acid ester is added to a magnetic layer of a magnetic recording medium that is mainly composed of ferromagnetic powder and binder resin (Japanese Patent Laid-Open Publication No. Sho 50-22603, Japanese Patent Laid-Open Publication No. Sho 50-153905, Japanese Patent Laid-Open Publication No. Sho 53-149302, Japanese Patent Laid-Open Publication No. Sho 55-139637, Japanese Patent Publication No. Sho 39-28367, Japanese Patent Publication No. Sho 41-18065, and Japanese Patent Publication No. Sho 47-12950).

These techniques, however, suffer a problem that many of the ester compounds that have straight-chain alkyls, which bring about their relatively high lubricating performance, have high melting points and thus form deposits on the surface of the magnetic layer at low temperatures. To cope with this, some techniques employ a fatty acid ester having a saturated or unsaturated branched hydrocarbon group with high molecular weight as an additive to the magnetic layer (Japanese Patent Publication No. Sho 47-12950, Japanese Patent Laid-Open Publication No. Sho 58-218038, Japanese Patent Laid-Open Publication No. Sho 60-205827, Japanese Patent Laid-Open Publication No. Sho 61-294637, and Japanese Patent Laid-Open Publication No. Sho 62-125529). One technique involves adding to the magnetic layer a fatty acid ester having the following general formula:

(II)

where $R^{11}$ is a straight-chain saturated alkyl having 6 to 12 carbons, $R^{12}$ is a straight-chain saturated alkyl having 4 to 10 carbons, and R is a straight-chain or branched alkyl having 4 to 22 carbons (Japanese Patent No. 2559259).

One type of magnetic read/write system, which has recently been put to practical use and is intended for use in a computer back-up system, reads data stored in a magnetic recording medium using a fixed MR head that operates at a relative speed of 2.0 to 5.0 m/s with respect to the recording medium. The system, known as the linear tape drive system, operates on the basis of linear scanning, in which a magnetic tape (which may be referred to simply as a tape, hereinafter) is moved along its length with respect to the fixed MR head as the data is read along that direction. Unlike a helical scanning system, which employs a rotary head, the magnetic tape is moved at high speeds in this system. As a result, the tape is vigorously rubbed against the head or guide rolls, causing the magnetic coating to come off the tape. For this reason, the role of the lubricant has become ever more significant to minimize damage to the coating, and should the coating come off the tape, it is desirable the coating does not stick to the surrounding area of the head gap.

No conventional fatty acid ester has ever achieved satisfactory performance when added to the magnetic layer in such a system. For example, fatty acid esters that have a saturated or unsaturated branched hydrocarbon with high molecular weight are less than satisfactory in terms of film strength and lubricating performance of the magnetic layer under low temperature conditions.

Fatty acid esters used in a magnetic disk as described in Japanese Patent No. 2559259 are less likely to crystallize and remain in a liquid state at relatively low temperatures, exhibiting lubricating property. These fatty acid esters do not readily evaporate from the surface of the magnetic layer at high temperatures, nor do they form deposits at low temperatures since fatty acid units and alcohol units present in the molecule have a limited number of carbons. Thus, the fatty acid esters, are capable of providing high running durability under various conditions. However, the lubricating performance of these fatty acid esters is not sufficient because of their high dynamic viscosity. Therefore, a high friction results when the fatty acid esters are applied to the tape. This causes abrasion of the coating.

The present invention addresses the above-identified problems associated with the prior art.

Accordingly, it is an objective of the present invention to provide a magnetic read/write system that uses a fixed MR head to read magnetically recorded data from a magnetic recording medium that has improved adherence to a head, running durability and wear resistance under low temperature conditions, as well as at room temperature, and to provide such a magnetic recording medium. In particular, the present invention aims at provision of a magnetic read/write system that uses a magnetic tape exhibiting improved performances in terms of the above-described adherence, running durability, and wear resistance when used in a linear tape drive system, in which the fixed MR head reads magnetically recorded data from a magnetic recording medium formed as a tape (i.e., a magnetic tape), such as DLT4, while operating at a relative speed of 2.0 to 5.0 m/s with respect to the recording medium. It is also an objective of the present invention to provide such a magnetic tape.

SUMMARY OF THE INVENTION

In the course of their studies to find a solution to the above-described problems, the present inventors have found that the above-described objectives can be achieved by providing a non-magnetic layer that contains a specific fatty acid ester and a fatty acid between a non-magnetic support and the above-described magnetic layer and ultimately completed the present invention.

In one aspect, the present invention provides a magnetic read/write system, in which a fixed MR head serves to read magnetically recorded data from a magnetic recording medium as it operates at a relative speed of 2.0 to 5.0 m/s with respect to the magnetic recording medium comprising a non-magnetic support and a magnetic layer, wherein a fatty acid ester represented by general formula (I):

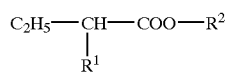

where $R^1$ is a hydrocarbon having 4 or less carbons, and $R^2$ is a straight-chain hydrocarbon having 12 or more carbons, exists between a read element of the MR head and the magnetic layer.

In another aspect, the present invention provides such a magnetic recording medium comprising:

a non-magnetic support;

a magnetic layer containing a ferromagnetic powder and a binder resin, the magnetic layer formed over the non-magnetic support and having a dry thickness of 0.5 μm; and a non-magnetic layer containing a non-magnetic powder and a binder resin, the non-magnetic layer interposed between the non-magnetic support and the magnetic layer; the non-magnetic layer containing as a lubricant a fatty acid ester represented by general formula (I):

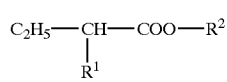

where $R^1$ is a hydrocarbon having 4 or less carbons, and $R^2$ is a straight-chain hydrocarbon having 12 or more carbons, and a fatty acid having 12 or more carbons.

The fatty acid ester of the general formula (I) for use with the present invention, which is derived from fatty acids having a hydrocarbon branch at 2'-position, has a low solidification point and does not suffer a significant decrease in the lubricity in low temperature conditions. In addition, this fatty acid ester has a shorter fatty acid side chain as compared to the conventional fatty acid esters as represented by the general formula (II) and thus exhibits low dynamic viscosity and shear viscosity even in low temperature conditions. Accordingly, by using the fatty acid ester, not only can the friction and the wear in the tape be reduced in a wide temperature range, but also the durability under various environments is improved. Furthermore, in terms of physical properties, the fatty acid ester exhibits less oiliness, the property being characteristic of fatty acid esters. This is believed to contribute to the improvements in the adherence to a head and stickiness of the tape. In the present invention, the fatty acid ester of the general formula (I) is added only to the non-magnetic layer and is allowed to gradually migrate from the non-magnetic layer through the magnetic layer to the surface thereof. In this manner, high durability and wear-resistance can be achieved even when the tape is moved at a relative speed of 2.0 to 5.0 m/s with respect to the fixed MR head. These effects are not obtained if the fatty acid ester is added only to the magnetic layer. The concurrent presence of the fatty acid with the non-magnetic powder in the non-magnetic layer makes it possible for the fatty acid ester to migrate in the manner described above.

DESCRIPTION OF THE PREFERRED EMBODIMENTS

The present invention will now be described in detail with reference to preferred embodiments.

Non-magnetic Support

A non-magnetic support for use in a recording medium of the present invention is a sheet of film and is properly selected from conventional resin films made of resin materials including, but not limited to, polyesters, polyamides, or aromatic polyamides, or resin films formed by laminating these films. Such films, as well as its thickness and other parameters, are known, and should not be limited to a particular one.

Magnetic Layer

Ferromagnetic powder contained in the magnetic layer of the magnetic recording medium of the present invention is a ferromagnetic metal powder that has a needle-like shape and preferably has an average major axis length of 0.15 μm or less, more preferably from 0.05 to 0.10 μm. If the powder has an average major axis length exceeding 0.15 μm the electromagnetic conversion characteristics (in particular, S/N and C/N characteristics) required of magnetic recording media will become insufficient.

Preferably, the ferromagnetic powder is contained in the magnetic layer composition in an amount of 70 to 90% by weight. If the amount of the ferromagnetic powder is excessively large, the amount of binder is reduced and, as a result, the surface smoothness of the recording medium after calendering worsens. Conversely, if the amount of the ferromagnetic material is excessively small, high read output cannot be achieved.

Examples of the binder resin for use in the magnetic layer include, but are not limited to, conventional thermoplastic resins, thermosetting resins, radiation cure resins, and mixtures thereof.

Preferably, the binder resin is contained in the magnetic layer in an amount of 5 to 40 parts by weight, particularly 10 to 30 parts by weight with respect to 100 parts by weight of the ferromagnetic powder. If the amount of the binder resin is too small, the strength of the magnetic layer is reduced and running durability may be lowered. On the other hand, if the amount is too large, the amount of the ferromagnetic metal powder is reduced, resulting in a reduced electromagnetic conversion characteristic.

When a thermosetting resin is used as the binder resin, various known polyisocyanates can be used to serve as a cross-linking agent for hardening the binder resin. The amount of the cross-linking agent contained in the magnetic layer is preferably from 10 to 30 parts by weight with respect to 100 weight parts of the binder resin. If necessary, abrasives, dispersing agents such as surface active agents, higher fatty acids and various other additives may be added to the magnetic layer.

A coating for forming the magnetic layer is prepared by adding an organic solvent to the above-described components. The organic solvent may be one or more solvents properly selected from ketone solvents including methylethylketone (MEK), methylisobutylketone and cyclohexanone, and aromatic compound solvents including toluene. The use of other organic solvents is also contemplated. The amount of the organic solvent to be added is preferably from about 100 to about 900 parts by weight with respect to 100 parts by weight of the total amount of solid content (such as the ferromagnetic metal powder and various inorganic particles) and the binder resin.

In the present invention, the magnetic layer has a thickness of 0.50 μm or less, preferably from 0.05 to 0.50 μm, and more preferably from 0.10 to 0.25 μm. The magnetic layer that is too thick may increase the self-magnetization loss and thickness loss.

Non-magnetic Layer

The magnetic recording medium of the present invention includes a non-magnetic layer interposed between the above-described magnetic layer and the non-magnetic support. In this manner, the electromagnetic conversion characteristic of the thin-layered magnetic layer is enhanced and reliability of the recording medium is further improved.

One characteristic of the present invention resides in that the non-magnetic layer contains as a lubricant a fatty acid ester represented by the following general formula:

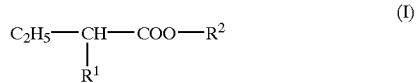

$$C_2H_5-\underset{R^1}{CH}-COO-R^2 \quad (I)$$

where $R^1$ is a hydrocarbon having 4 or less carbons, and $R^2$ is a straight-chain hydrocarbon having 12 or more carbons. Among such fatty acid esters, cetyl 2-ethylhexanoate, stearyl 2-ethylhexanoate, myristyl 2-ethylhexanoate and stearyl 2-ethylbutanoate are preferred, cetyl 2-ethylhexanoate being particularly preferred.

By adding these fatty acid esters to the non-magnetic layer, the DLT4 durability as well as adherence to head can further be improved as compared to using conventional fatty acid esters. Also, the decrease in the durability due to discharge, which is seen when fatty acid esters with melting points of 30° C. or higher are used, does not take place in relatively low temperature environments. Also, the fatty acid esters of the present invention, serving as a lubricant, have a smaller dynamic viscosity and a shear viscosity due to their relatively shorter carbon chains than those of the conventional fatty acid esters. Accordingly, damage to the coating caused by the friction between the magnetic layer of the magnetic tape and a back-coat layer is reduced. If the fatty acid ester having the general formula (I) has $R^1$ containing 5 or more carbons or has its ethyl replaced with an alkyl with 3 or more carbons, the fatty acid ester becomes oily, which affects the adherence to a head and stickiness of the tape. If $R^3$ has less than 12 carbons, the fatty acid ester tends to crystallize in low temperature conditions and tends to evaporate from the surface of the magnetic layer in high temperature conditions.

Preferably, the lubricant is blended in the non-magnetic layer in an amount of 0.2 to 5 parts by weight with respect to 100 weight parts of the non-magnetic powder. If the amount is less than 0.2 parts by weight, the effects cannot be achieved. If the amount exceeds 5 parts by weight improvements in the running durability or wear resistance of the tape are not as significant as expected from the amount. In addition, if the amount is excessive, significant problems arise especially with tapes, such as reduced durability due to discharge and the magnetic layer sticking to the back-coat layer.

The non-magnetic layer contains at least non-magnetic powder, binder resin, and fatty acid with 12 or more carbons and has a thickness of preferably 2.5 μm or less, more preferably from 0.1 to 2.3 μm. The thickness larger than 2.5 μm does not improve performance of the non-magnetic layer any further. On the contrary, too large a thickness can often result in non-uniformity in thickness in a coating layer. Not only does this require stricter coating conditions but also may result in a reduced surface smoothness.

Various inorganic powders can be used as the non-magnetic powder for use in the non-magnetic layer. For example, needle-shaped non-magnetic powders, such as needle-shaped non-magnetic iron oxide ($\alpha\text{-Fe}_2\text{O}_3$), are preferably used. Various other non-magnetic powders, including calcium carbonate ($CaCO_3$), titanium oxide ($TiO_2$), barium sulfate ($BaSO_4$), and α-alumina ($\alpha\text{-Al}_2\text{O}_3$), may preferably be blended. The non-magnetic layer preferably contains a carbon black, example of which includes furnace black for rubber, thermal black for rubber; black for color and acetylene black.

The carbon black and the inorganic powder are preferably blended at a ratio of 100:0 to 10:90 by weight. The proportion of the inorganic powder greater than 90 may lead to a problem in terms of surface electrical resistance.

As with the case of the magnetic layer, the binder resin may be a conventional thermoplastic resin, thermosetting resin, radiation cure resin and a mixture thereof, with the radiation cure resin being particularly preferred.

It is essential that the non-magnetic layer of the present invention further contain as an additive a fatty acid with 12 or more carbons, preferably stearic acid. When necessary, it may further contain a dispersing agent, such as a surface-active agent, and various other additives.

Back-coat Layer

A back-coat layer is optionally provided for the purposes of improving running stability and prevent static electricity from building up in the magnetic layer. The back-coat layer preferably contains from 30 to 80% by weight of carbon black, which may be any of commonly used carbon blacks and may be the same as that used in the non-magnetic layer. In addition to the carbon black, the back-coat layer may optionally contain non-magnetic inorganic powders, such as the abrasives used in the magnetic layer, a dispersing agent such as a surface-active agent, a lubricant such as higher fatty acid, fatty acid ester and silicone oil, and various other additives.

The back-coat layer has a thickness of 0.1 to 1.0 μm, preferably 0.2 to 0.8 μm (after calendering). The thickness greater than 1.0 μm results in excessive friction between the recording medium and the path that the recording medium follows and is rubbed against. This leads to reduced running stability. On the other hand, the thickness less than 0.1 μm results in the back-coat layer being abraded as the recording medium is moved.

The above-described recording medium of the present invention has improved adherence to a head, running durability, and wear resistance of the tape and thus is suitable for use with fixed MR heads under low temperature conditions as well as at room temperature. In an MR head, resistance of a read sensor, which uses a magnetic material, changes when the read sensor is exposed to magnetic field, which allows the head to read external magnetic signals. Output of an MR head is not affected by the relative speed of the head with respect to the recording medium, and for this reason, MR heads achieve high output when used to read magnetically recorded data recorded with a high track recording density. In order to achieve high resolution and high RF characteristic, a typical MR head has a construction in which a magnetoresistive film (MR film) is interposed between a pair of magnetic shield film (Shielded MR head).

In a preferred magnetic read/write system, data is first recorded magnetically on the magnetic recording medium of the present invention and the data is then read using a fixed MR head operated at a relative speed of 2.0 to 5.0 m/s. The fatty acid ester of general formula (I) added to the non-magnetic layer of the magnetic recording medium is allowed to exist between the read element of the MR head and the magnetic layer.

EXAMPLES

The present invention will now be described with reference to examples.

Example 1

<Coating 1 for forming non-magnetic layer>

| | |
|---|---|
| Needle-shaped α-$Fe_2O_3$ (DPN-250BW manufactured by TODA KOGYO Co., Ltd.) (Average minor axis diameter = 28 nm, BET = 55 $m^2$/g) | 70 parts by weight |
| Carbon black (#850B manufactured by MITSUBISHI CHEMICAL Co., Ltd.) (Average particle size = 16 nm, BET = 200 $m^2$/g, DBP oil absorbance = 70 ml/100 g) | 30 parts by weight |
| α-$Al_2O_3$ (HIT60A manufactured by SUMITOMO CHEMICAL Co., Ltd.) (Average particle size = 0.18 μm, BET = 12 $m^2$/g) | 5.5 parts by weight |
| Electron beam-curable vinyl chloride copolymer (Degree of polymerization = 300, polar group: —$OSO_3K$ = 1.5/molecule) | 20 parts by weight |
| Electron beam-curable polyurethane resin (Mn = 25000, polar group: sodium hypophosphite = 1/molecule) | 8 parts by weight |
| MEK | 120 parts by weight |
| Toluene | 120 parts by weight |
| Cyclohexanone | 60 parts by weight |

The above-listed components were mixed and kneaded and dispersed using a sand grinder mill.

The following additives and solvents were then added to adjust viscosity. This completed the non-magnetic coating 1.

| | |
|---|---|
| Cetyl 2-ethylhexanoate | 2 parts by weight |
| Stearic acid | 1 part by weight |
| MEK | 40 parts by weight |
| Toluene | 40 parts by weight |
| Cyclohexanone | 40 parts by weight |

<Magnetic coating 1>

| | |
|---|---|
| Fe-based metal magnetic powder (containing 10 atm % Co and 5 atm % Al with respect to Fe (= 100)) (Hc = 144.6 kA/m, σs = 130 $Am^2$/kg, BET = 57 $m^2$/g, average major axis length = 0.10μm) | 100 parts by weight |
| Vinyl chloride copolymer (MR110 manufactured by ZEON Co., Ltd.) (Degree of polymerization = 300, polar group: —$OSO_3K$ = 1.5/molecule) | 10 parts by weight |
| $SO_3Na$-containing polyurethane resin (Mn = 25000, polar group conc. = 1/molecule) | 7 parts by weight |
| α-$Al_2O_3$ (HIT82 manufactured by SUMITOMO CHEMICAL Co., Ltd.) (Average particle size = 0.12 μm, BET = 20 $m^2$/g) | 12 parts by weight |
| Myristic acid | 2 parts by weight |
| MEK | 90 parts by weight |
| Toluene | 90 parts by weight |
| Cyclohexanone | 120 parts by weight |

The above-listed components were mixed and kneaded and dispersed using a sand grinder mill.

The following solvents were then added to adjust viscosity, completing the magnetic coating 1.

| | |
|---|---|
| MEK | 110 parts by weight |
| Toluene | 110 parts by weight |
| Cyclohexanone | 160 parts by weight |

<Coating for forming back-coat layer>

| | |
|---|---|
| Carbon black (Conductex SC manufactured by COLUMBIAN CARBON Co., Ltd., average particle size = 20 nm, BET = 220 $m^2$/g) | 80 parts by weight |
| Carbon black (Sevacarb MT manufactured by COLUMBIAN CARBON Co., Ltd., average particle size = 350 nm, BET = 8 $m^2$/g) | 1 part by weight |
| α-$Fe_2O_3$ (TF100 manufactured by TODA KOGYO Co., Ltd., average particle size = 0.1 μm) | 1 part by weight |
| Vinyl chloride-vinyl acetate-vinyl alcohol copolymer (Ratio by weight of monomers = 92:3:5, average degree of polymerization = 420) | 65 parts by weight |
| Polyesterpolyurethane resin (UR-8300 manufactured by TOYOBO Co., Ltd.) | 35 parts by weight |
| MEK | 260 parts by weight |
| Toluene | 260 parts by weight |
| Cyclohexanone | 260 parts by weight |

The components above were mixed and kneaded and dispersed using a sand grinder mill.

The following additives and solvents were then added to adjust viscosity. This completed the coating for forming the back-coat layer.

| | |
|---|---|
| MEK | 210 parts by weight |
| Toluene | 210 parts by weight |
| Cyclohexanone | 210 parts by weight |

Preparation of Magnetic Tape

The coating 1 for non-magnetic layer was applied onto one surface of a biaxially oriented, laminated PEN (polyethylene naphthalate) film having a thickness of 6.2 μm. The coating was then dried and subjected to calendering. Subsequently, an electron beam was irradiated (5 Mrad) onto the film in nitrogen atmosphere to harden the coating. The coating 1 for magnetic layer was then applied on top of the non-magnetic layer, oriented, dried, and subjected to calendering. After calendering, the magnetic layer and the non-magnetic layer had thicknesses of 0.2 μm and 1.8 μm, respectively. Subsequently, the coating for back-coat layer was applied to the opposite surface of the PEN film, dried, and subjected to calendering. After calendering, the back-coat layer had a thickness of 0.5 μm.

The film roll obtained in this manner was left for 24 hours at room temperature and was then hardened in an oven for 24 hours at 60° C. The roll was then cut into ½ inch-wide tapes, which in turn were fitted in a cassette to make a sample magnetic tape.

Example 2

A sample magnetic tape was fabricated in the same manner as in Example 1 except that stearyl 2-ethylhexanoate was used in place of cetyl 2-ethylhexanoate in the non-magnetic coating 1.

Example 3

A sample magnetic tape was fabricated in the same manner as in Example 1 except that myristyl 2-ethylhexanoate was used in place of cetyl 2-ethylhexanoate in the non-magnetic coating 1.

Example 4

A sample magnetic tape was fabricated in the same manner as in Example 1 except that stearyl 2-ethylbutanoate was used in place of cetyl 2-ethylhexanoate in the non-magnetic coating 1.

Comparative Example 1

A sample magnetic tape was fabricated in the same manner as in Example 1 except that cetyl 2-ethyldecanoate was used in place of cetyl 2-ethylhexanoate in the non-magnetic coating 1.

Comparative Example 2

A sample magnetic tape was fabricated in the same manner as in Example 1 except that decyl 2-ethyldecanoate was used in place of cetyl 2-ethylhexanoate in the non-magnetic coating 1.

Comparative Example 3

A sample magnetic tape was fabricated in the same manner as in Example 1 except that t-butyl stearate was used in place of cetyl 2-ethylhexanoate in the non-magnetic coating 1.

Comparative Example 4

A sample magnetic tape was fabricated in the same manner as in Example 1 except that isocetyl stearate was used in place of cetyl 2-ethylhexanoate in the non-magnetic coating 1.

Comparative Example 5

A sample magnetic tape was fabricated in the same manner as in Example 1 except that isobutyl stearate was used in place of cetyl 2-ethylhexanoate in the non-magnetic coating 1.

Comparative Example 6

A sample magnetic tape was fabricated in the same manner as in Example 1 except that sec-butyl stearate was used in place of cetyl 2-ethylhexanoate in the non-magnetic coating 1.

Comparative Example 7

A sample magnetic tape was fabricated in the same manner as in Example 1 except that stearic acid was not added to the non-magnetic coating 1.

Comparative Example 8

A sample magnetic tape was fabricated in the same manner as in Example 1 except that cetyl 2-ethylhexanoate was not added to the non-magnetic coating 1 and two parts by weight of cetyl 2-ethylhexanoate were added to the magnetic coating 1.

Each of the magnetic recording media obtained in Examples and Comparative Examples were measured for the following properties.

Running Durability

Using a DLT-4000 drive manufactured by Quantum (relative speed between the fixed MR head and the magnetic tape=2.4 m/s), each tape was tested for the running durability by passing the tape 1,000,000 times over the fixed MR head to read/write data from/to part of the tape at room temperature (about 23° C., 50%RH) and at 10° C., 20%RH. The tape was determined to be defective when the number of retry attempts of the read/write operation increased or when it was no longer possible to read/write from/to the tape before the number of the tape pass reached 1,000,000 times. (Degree of coating abrasion after the layers were rubbed against each other.)

Using a horizontal high-speed tensile tester, model no. HTB-S manufactured by Island Industry, the magnetic layer and the back-coat layer of the tape were repeatedly rubbed against one another and the layers were observed for abrasion using an optical microscope. Measurements were taken at a temperature of 20° C. and humidity of 60%. For measurement, the tape was mounted on a first guide roll of the DLT-4000 drive with the back-coat layer facing outside and in contact with the magnetic layer. The tape was passed 300 times over a distance of 50 mm at a speed of 2000 mm/min with the applied load of 40 g and the holding angle of 90°. After the 300 passes, the magnetic layer and the back-coat layer were observed for the degree of abrasion. Ratings were given on a scale of A, B and C; where A=no abrasion, B=mode abrasion, and C=considerable abrasion.

Adherence to Head

Using a DLT-4000 drive manufactured by Quantum, each sample tape was run for 2400 cycles to read/write data both at room temperature (about 23° C., 50%RH) and at 10° C., 20%RH. Subsequently, adherence to the head was observed using an optical microscope at ×100. Ratings were given on a scale of A, B and C; where A=no adhesion to the head, B=moderate adhesion to head, and C=adhesion to the entire surface of the head.

The results are shown in Tables 1 to 3 below.

TABLE 1

|  | Fatty acid ester in non-magnetic layer | Number of carbons in $R^1$ in formula (I) | Number of carbons in $R^2$ in formula (I) | DLT4 running durability (passes) | | Adherence to head | | |
| --- | --- | --- | --- | --- | --- | --- | --- | --- |
|  |  |  |  | Rm temp. | 10° C. 20% | Coating abrasion | Rm temp. | 10° C. 20% |
| Ex. 1 | cetyl 2-ethylhexanoate | 4 | 16 | 1 million | 1 million | A | A | A |
| Ex. 2 | stearyl 2-ethylhexanoate | 4 | 18 | 1 million | 1 million | A | A | B |
| Ex. 3 | myristyl 2-ethylhexanoate | 4 | 12 | 1 million | 1 million | B | A | A |

TABLE 1-continued

| | Fatty acid ester in non-magnetic layer | Number of carbons in $R^1$ in formula (I) | Number of carbons in $R^2$ in formula (I) | DLT4 running durability (passes) Rm temp. | 10° C. 20% | Coating abrasion | Adherence to head Rm temp. | 10° C. 20% |
|---|---|---|---|---|---|---|---|---|
| Ex. 4 | stearyl 2-ethylbutanoate | 2 | 18 | 1 million | 1 million | B | A | A |
| Comp. Ex. 1 | cetyl 2-ethyldecanoate | 8 | 16 | Half a million | 300,000 | C | A | B |
| Comp. Ex. 2 | decyl 2-ethyldecanoate | 4 | 10 | ¾ million | 400,000 | B | A | A |

TABLE 2

| | Fatty acid ester in on-magnetic layer | DLT4 running durability (passes) Rm temp. | 10° C. 20% | Coating abrasion | Adherence to head Rm temp. | 10° C. 20% |
|---|---|---|---|---|---|---|
| Comp. Ex. 3 | t-butyl steareate | 700,000 | 300,000 | B | B | B |
| Comp. Ex. 4 | isocetyl stearate | 350,000 | 200,000 | B | B | C |
| Comp. Ex. 5 | isobutyl stearate | 500,000 | 300,000 | B | A | A |
| Comp. Ex. 6 | sec-butyl stearate | 500,000 | 400,000 | B | A | A |

TABLE 3

| | Non-magnetic powder in non-magnetic layer | DLT4 running durability (passes) Rm temp. | 10° C. 20% | Coating abrasion | Adherence to head Rm temp. | 10° C. 20% |
|---|---|---|---|---|---|---|
| Ex. 1 | DPN-250BW (α-iron oxide, needle-shaped) | 1 million | 1 million | A | A | A |
| Comp. Ex. 7 | DPN-250BW (α-iron oxide, needle-shaped) | 450,000 | 100,000 | C | B | B |
| Comp. Ex. 8 | DPN-250BW (α-iron oxide, needle-shaped) | 200,000 | 50,000 | C | C | C |

As has been described thus far, the present invention provides a magnetic recording medium that exhibits improved adherence to heads, running durability, and wear resistance of the tape in low temperature conditions as well as at room temperature. The magnetic recording medium of the present invention is suitable for use in the magnetic read/write system employing a fixed MR head.

While presently preferred embodiments of the present invention have been described, it should be appreciated that various changes and modifications may be made by those skilled in the art without departing from the scope of the invention as set forth in the appended claims.

What is claimed is:

1. A magnetic read/write system, in which a fixed MR head serves to read magnetically recorded data from a magnetic recording medium as it operates at a relative speed of 2.0 to 5.0 m/s with respect to the magnetic recording medium comprising a non-magnetic support and a magnetic layer, wherein a fatty acid ester represented by general formula (I):

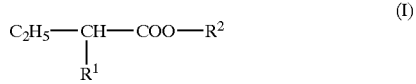

where $R^1$ is a hydrocarbon having 4 or less carbons, and $R^2$ is a straight-chain hydrocarbon having 12 or more carbons, exists between a read element of the MR head and the magnetic layer.

2. The magnetic read/write system according to claim 1, wherein the magnetic recording medium comprising:
   a non-magnetic supports;
   a magnetic layer containing a ferromagnetic powder and a binder resin, the magnetic layer formed over the non-magnetic support and having a dry thickness of 0.5 μm; and
   a non-magnetic layer containing a non-magnetic powder and a binder resin, the non-magnetic layer interposed between the non-magnetic support and the magnetic layer, the non-magnetic layer containing as a lubricant said fatty acid ester and a fatty acid having 12 or more carbons.

3. A magnetic recording medium comprising:
a non-magnetic support;
a magnetic layer containing a ferromagnetic powder and a binder resin, the magnetic layer formed over the non-magnetic support and having a dry thickness of 0.5 μm; and
a non-magnetic layer containing a non-magnetic powder and a binder resin, the non-magnetic layer interposed between the non-magnetic support and the magnetic layer, the non-magnetic layer containing as a lubricant a fatty acid ester represented by general formula (I):

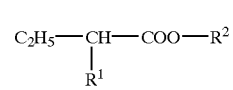

where $R^1$ is a hydrocarbon having 4 or less carbons, and $R^2$ is a straight-chain hydrocarbon having 12 or more carbons, and a fatty acid having 12 or more carbons.

* * * * *